United States Patent [19]
Feller

[11] Patent Number: 5,392,657
[45] Date of Patent: Feb. 28, 1995

[54] FLOW SENSOR HAVING HIGH IMPEDANCE CIRCUIT WITH CAPACITIVE SENSING ELECTRODE

[75] Inventor: Murray F. Feller, Citrus County, Fla.

[73] Assignee: Onicon Incorporated, Clearwater, Fla.

[21] Appl. No.: 20,908

[22] Filed: Feb. 22, 1993

Related U.S. Application Data

[63] Continuation of Ser. No. 632,520, Feb. 13, 1991, abandoned.

[51] Int. Cl.6 .............................................. G01F 15/00
[52] U.S. Cl. ............................ 73/861.77; 340/870.37
[58] Field of Search ...................... 73/861.77, 861.78; 361/285; 331/665; 340/870.37, 870.31; 324/160, 163, 671, 663, 686

[56] References Cited

U.S. PATENT DOCUMENTS

| | | | |
|---|---|---|---|
| 3,101,615 | 8/1963 | Pavone | 73/861.78 |
| 3,776,033 | 12/1973 | Herzl | 73/861.22 |
| 3,963,920 | 6/1976 | Palmer | 250/239 |
| 4,006,411 | 2/1977 | Akagawa et al. | 324/61 R |
| 4,088,022 | 5/1978 | Kalotay | 73/861.78 |
| 4,164,866 | 8/1979 | Mitchell et al. | 73/231 R |
| 4,310,807 | 1/1982 | McKee | 331/65 |
| 4,324,144 | 4/1982 | Miyata et al. | 73/861.77 |
| 4,415,859 | 11/1983 | Slough et al. | 324/236 |
| 4,424,860 | 9/1983 | Wood et al. | 73/861.78 |
| 4,456,069 | 6/1984 | Vigneri | 166/303 |
| 4,462,262 | 7/1984 | Kahnke | 73/861.05 |
| 4,523,480 | 6/1985 | Inoue | 73/861.56 |
| 4,535,637 | 8/1985 | Feller | 73/861.77 |
| 4,581,943 | 4/1986 | Feller | 73/861.77 |
| 4,790,195 | 12/1988 | Feller | 73/861.77 |
| 4,829,833 | 5/1989 | Feller | 73/861.77 |
| 4,871,931 | 10/1989 | Fitzpatrick et al. | 307/491 |
| 4,879,912 | 11/1989 | Suckow | 73/861.61 |
| 5,117,691 | 6/1992 | Fraser | 73/204.15 |

FOREIGN PATENT DOCUMENTS 1140047  2/1985  U.S.S.R. ................ 73/861.77

Primary Examiner—Kenneth A. Wieder
Assistant Examiner—Raymond Y. Mah

[57] ABSTRACT

Apparatus is provided in which flow to be monitored actuates a device to move past a sensing electrode, causing changes of a capacitive sensing impedance in series with an impedance transformation device. The sensing electrode is at the high-impedance level of the impedance transformation device. Only a small fraction of the stray capacitance of circuit wiring, etc., which is connected at the low-impedance level of the impedance transformation device is reflected as a dulling shunt across the sensing capacitance.

31 Claims, 2 Drawing Sheets

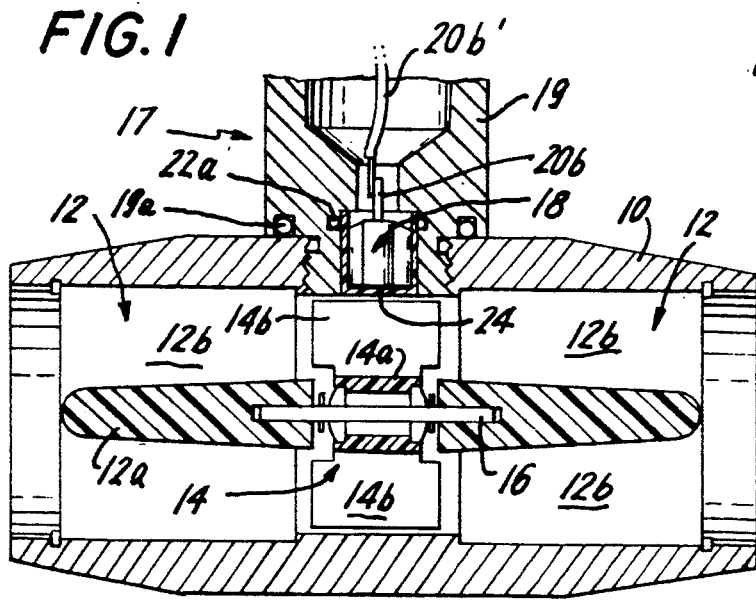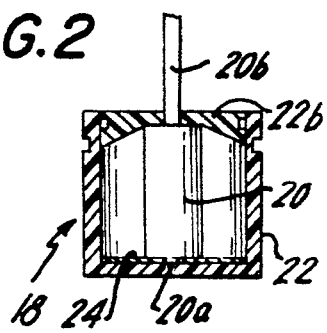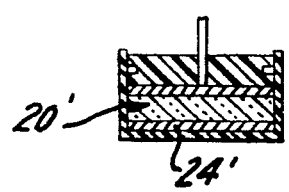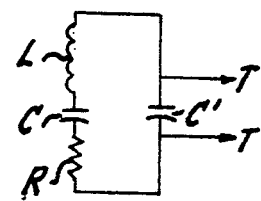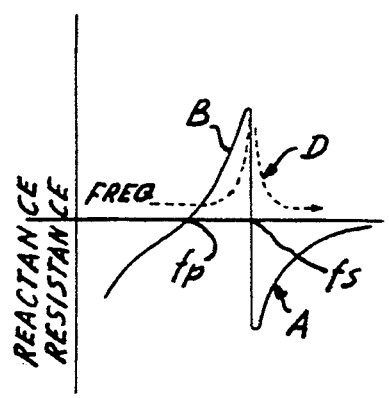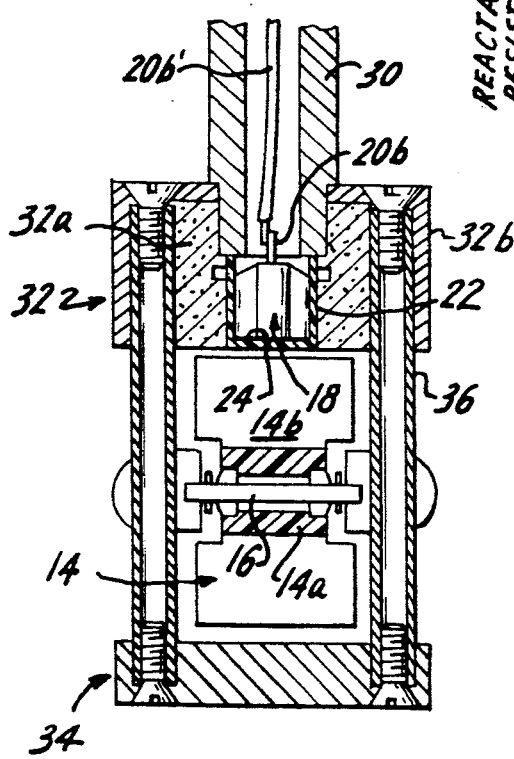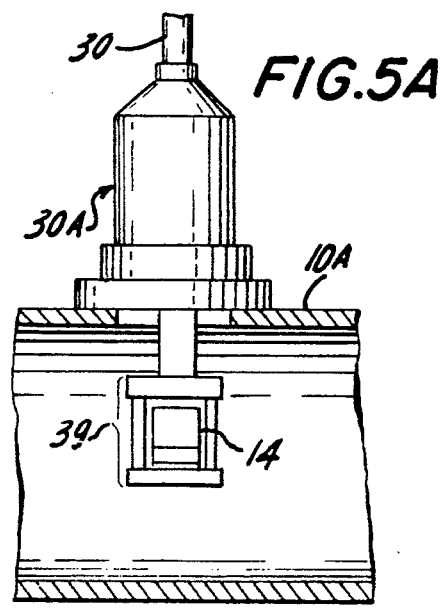

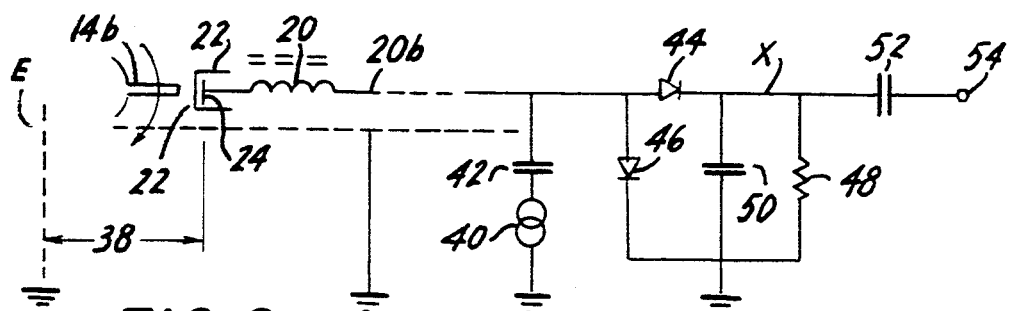
FIG.6
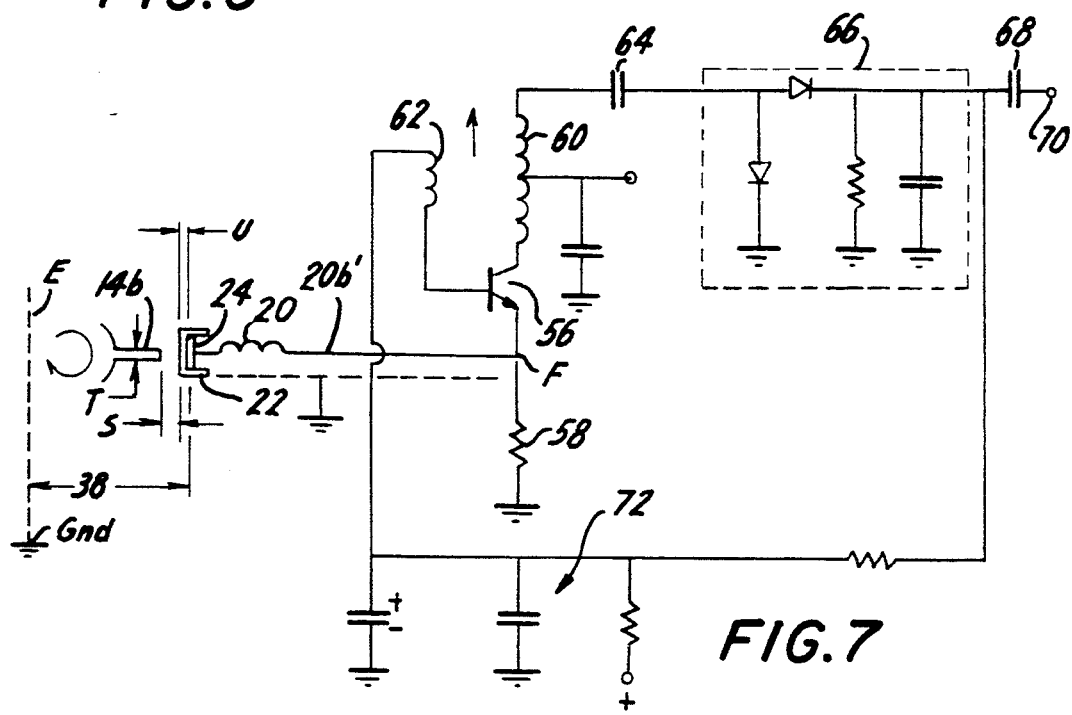
FIG.7
FIG.8
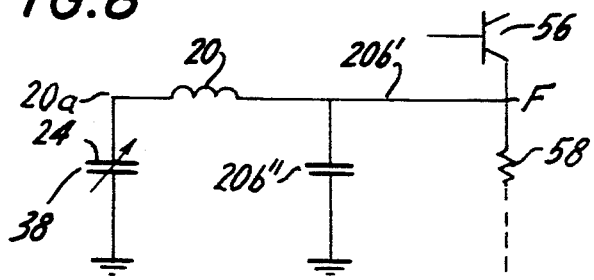
FIG.9
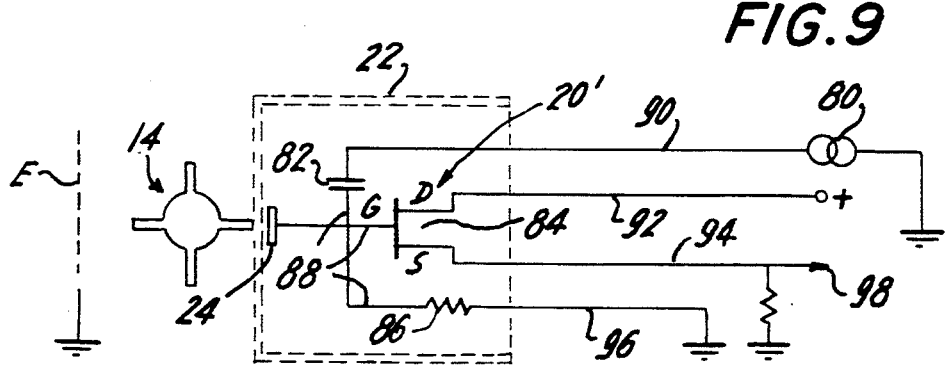

FLOW SENSOR HAVING HIGH IMPEDANCE CIRCUIT WITH CAPACITIVE SENSING ELECTRODE

This is a continuation of application Ser. No. 07/632,520, filed Feb. 13, 1991, (now abandoned).

The present invention relates to electronic sensors used in measuring the volume and/or the flow rate of gases such as air and liquids such as water, non-viscous hydrocarbons, etc. More particularly, this invention relates to the type of flow sensor in which a flow-actuated device is sensed by one or more electrodes to produce flow-representing output.

BACKGROUND OF THE INVENTION

Flow sensors are known in which a flow-representing output signal depends on changes that occur as a flow-actuated device passes one or more sensing electrodes. One type of this kind of flow sensor is designed for monitoring the flow of somewhat conductive liquid, notably tap water. My patents U.S. Pat. No. 4,333,354 issued Jun. 6, 1982, U.S. Pat. No. 4,399,696 issued Aug. 23, 1983 and U.S. Pat. No. 4,890,499 issued Jan. 2, 1990 are illustrative. Another type of this kind of flow sensor is useful for monitoring the flow of non-conductive fluids such as nonviscous hydrocarbon liquids and gases such as air. In those known flow sensors, there is a flow-actuated device that passes a capacitive electrode or multiple capacitive electrodes (considered further below). U.S. Pat. No. 4,164,866 issued Aug. 21, 1979, U.S. Pat. No. 4,324,144 issued Apr. 13, 1982 and U.S. Pat. No. 4,581,943 issued Apr. 15, 1986 are illustrative.

A so-called "in-line" form of these flow sensors involves a flow-actuated device that orbits inside a pipe that forms a passage, and in which the wall of the pipe supports the sensing electrode or electrodes. My patents U.S. Pat. No. 4,333,354 and U.S. Pat. No. 4,890,499 disclose in-line flow sensors in which the flow-actuated device is an orbital ball; and patents U.S. Pat. Nos. 4,164,866 and U.S. Pat. No. 4,324,144 disclose in-line flow sensors in which the flow actuated device is a vaned rotor.

A so-called "probe" form of flow sensor includes a supporting stem that projects through a pipe's wall and supports a flow-sensing assembly or multiple assemblies inside the pipe, each assembly including a flow-actuated device and one or more sensing electrodes. My patents U.S. Pat. Nos. 4,379,696 and 4,829,833 disclose probe-type flow sensors; and in those patents, each flow-actuated device is a vaned rotor; and each of those flow sensors is disclosed as being used in monitoring the flow of somewhat conductive liquid. In the probe type of flow-sensing apparatus, the flow-sensing assembly of the electrode(s) and the flow-actuated device, including the frame structure that maintains the parts assembled, has a practical constraint: its dimensions are limited so that the assembly can be inserted into the pipe via a hole of limited size.

In flow-sensing apparatus used for sensing the flow of non-conductive fluid, the response of the sensing electrode(s) and the connected circuit to the flow-actuated device depends on the capacitive effect of the flow-actuated device on the sensing electrode(s). The sensing electrode(s) and the sensing apparatus including its circuit connected to the sensing electrode(s) are here called "capacitive sensing electrodes" and "capacitive flow-sensing apparatus" to signify their capability of responding to capacitive effects. The sensing electrode or each sensing electrode acts as an electrode of a capacitor; it is differently affected by the different dielectric and/or loss properties of the flow-activated device and the fluid to be monitored. The sensing capacitive electrode or each of a pair of such sensing electrodes in a flow sensor is inherently quite small so that the capacitance identified with such a sensing electrode is typically 1.0 pf, perhaps 1.0 to 3.0 pf.

Changes that affect only the capacitive electrode determine response to the flow-actuated device; stray capacitance of any wiring or other conductive structure connected to a sensing electrode adds to the total capacitance but stray capacitance is not affected by the flow-actuated device. As the stray capacitance increases, the percentage of the flow-representing change in the total capacitance decreases until a point is reached where the changes are not readily detectable. For that reason, in practical apparatus exemplifying my '943 patent, stray capacitance of wiring from the sensing electrode to its circuit is minimized, as by using fine wire and by using maximum spacing between such wire and nearby grounded structure. Heretofore it has not been practical to make a two-rotor flow sensing probe (such as that shown in my '696 patent) having capacitive sensing electrodes because of the large amount of stray capacitance of necessary wiring to the lower sensing electrode 32. That wiring may be 15 inches long.

SUMMARY OF THE INVENTION

The present invention provides novel flow sensors of the capacitive type. Pursuant to the invention, novel sensing means is provided that is suitable for responding to flow-actuated devices, even thin vanes of a flow-actuated rotor of insulation. And the invention provides novel capacitive flow sensors of the probe type that are suitable for monitoring the flow of non-conductive liquids and gases.

In the illustrative flow sensors detailed below, a capacitance is formed of the capacitive sensing electrode and a companion electrode and the substance—mainly the flowing liquid—in the space between the electrodes. The vanes of the vaned rotor modify the capacitance as they sweep past the sensing electrode. As in my patent U.S. Pat. No. 4,399,696, a probe type of flow sensor may have two or more assemblies of a sensing electrode and a respective vaned rotor. Those components are ordinarily quite small, as noted above, so that only a very small effect is created by each slender vane in passing its capacitive sensing electrode.

In the illustrative example of a novel probe type of flow sensor detailed below, an impedance transformation-device is disposed in close proximity to a capacitive sensing electrode, as part of the probe structure. A high-impedance terminal of that device is connected directly (consistent with practical imitations) to the sensing electrode, arranged to develop very little stray capacitance acting as a shunt across the sensing capacitor. Wiring extends from a low impedance terminal of the impedance transformation device for transmitting flow-representing signals. Notably, the stray or distributed capacitance of that wiring contributes very little shunt capacitance to the sensing electrode.

Three-types of impedance transformation devices are included in the embodiments of the invention detailed below. In the preferred construction, a coil has a "common connection" to the capacitive sensing electrode. An inductive impedance is thus connected in series with the capacitive impedance of the sensing capacitor. The inductive impedance and the capacitive impedance are at or near series-resonance at such an excitation frequency that the vanes of the flow-actuated rotor, in passing the sensing electrode, develop (ideally) the maximum range of end-to-end impedance changes of the series-connected impedances.

The sensing electrode is largely isolated from the capacitances of the signal-utilization circuit connected to the opposite-end terminals of the series-resonant circuit. In this way, the variations in the sensing capacitive impedance caused by the flow-activated device are utilized to a maximum in developing the flow-representing output signal.

In an alternative embodiment, once again a capacitive impedance is represented by the capacitive sensing electrode and its companion electrode and the substance in the space between the electrodes. What may be called a "semiconductor-follower device" is an impedance transformation device mounted at and connected to the sensing electrode. Two devices of this kind are detailed below, including an FET (field-effect transistor) and a bipolar amplifying resistor, arranged as a source-follower and an emitter-follower, respectively. The emitter of the transistor or the gate of the FET, being a high impedance input terminal, is connected to the capacitive sensing electrode. As with the coil of the series-resonant circuit, each of these semiconductor follower devices is an impedance transformation device that largely isolates the capacitive sensing impedance from the stray capacitances of the flow-signal developing circuit. Thus, the flow-representing changes at the sensing electrode are utilized efficiently.

As noted below, a crystal may be operated in a manner that causes it to behave as an inductance; such inductance serves as a form of impedance transformation device.

Despite the very small size of sensing electrodes that may well be needed in a probe type of capacitive flow sensor, the flow-representing changes of capacitance are utilized efficiently in providing flow-representing signals. Capacitances of the wiring to the sensing electrode and the connected circuit that might shunt the sensing capacitance are largely isolated from the sensing electrode. The improvements in flow sensors outlined above in relation to probe-type flow sensors are also useful to advantage in other capacitive flow sensors.

The series circuit comprising the flow-sensing capacitive impedance and the impedance transformation device develops high impedance where they are connected to each other as a series circuit, i.e., at their "common connection", and low impedance at the opposite ends of the series circuit. The circuit that utilizes the flow-representing variations in the capacitive sensing impedance is connected to the low impedance opposite ends of the series circuit. In an exemplary embodiment, a capacitive flow-sensing impedance is connected in series with an inductive impedance, forming a series circuit of impedances whose end-to-end impedance changes as the flow-actuated device sweeps past the sensing electrode; and this series circuit serves as a gain-control impedance of a variables-gain amplifier, for providing a flow-representing output signal. The same variable-gain amplifier is part of an oscillator that impresses excitation on the series-connected impedances at the opposite ends of the series-connected impedances.

The sensing apparatus including a sensing electrode and its connected circuit has such high sensitivity as to respond to even thin vanes of a flow-actuated molded plastic rotor, ordinarily low-loss insulation, in an insulating fluid whose dielectric constant differs from the dielectric constant of the vanes. The novel apparatus is also applicable to monitoring the flow of liquids whose dielectric constant is close to that of the vanes, by making the vanes of insulation that is distinctly more lossy than the liquid. The novel apparatus is also useful in other conditions, as with a vaned rotor made of metal, or with other flow-actuated devices such as an orbital ball; and with conductive liquid. Notably, the apparatus operates successfully when the sensing electrode is covered by insulation for protection against attack by the fluid, but the sensing electrode can be bare—exposed to the fluid—as may be appropriate.

The nature of the invention including further novel features and advantages will be more fully appreciated from the following detailed description of various illustrative embodiments shown in the accompanying drawings.

BRIEF DESCRIPTION OF THE DRAWINGS

FIG. 1 is the longitudinal cross-section of an in-line flow sensor incorporating features of the invention;

FIG. 2 is an enlarged detail of FIG. 1;

FIG. 2A is a modification of FIG. 2;

FIG. 3 is an equivalent circuit diagram of a crystal used as an alternative to a coil;

FIG. 4 is a frequency-versus-amplitude diagram of a crystal showing its performance as an inductive impedance;

FIG. 5 is a flow-responsive probe shown in longitudinal cross-section;

FIG. 5A is a diagrammatic view of the probe of FIG. 5 installed in a pipe;

FIGS. 6 and 7 are alternative diagrams of operating circuits for the apparatus in FIGS. 1 and 5;

FIG. 8 is an equivalent circuit diagram of a portion of FIGS. 6 and 7; and

FIG. 9 is a schematic of a capacitive flow-sensor and a semiconductor-follower device as an alternative to the embodiments shown in FIGS. 6 and 7.

DETAILED DESCRIPTION OF THE ILLUSTRATIVE EMBODIMENTS

An in-line flow-sensing structure is shown in FIG. 1, embodying aspects of the invention. In FIG. 1, a short length of pipe 10 provides a cylindrical flow passage. Two flow-straightening units 12 are spaced apart in pipe 10, each unit having multiple flow-straightening vanes 12b in planes extending radially outward from hub 12a. A flow-actuated vaned rotor 14 is rotatably supported on shaft 16 that is carried by hubs 12a. Rotor 14 includes a hub 14a and vanes 14b that extend outward of the hub and have spiralled curvature along the hub, resembling turbine blades, so that rotor 14 is actuated by flow of fluid along the pipe. Rotor 14 turns at a rate directly proportional to the flow rate over a wide range of flow rates.

A sensing module 17 is mounted on pipe 10, including a stub 19 that has a threaded end portion screwed into the pipe. Appropriate sealing means to prevent leakage should be provided, such as O-ring 19a. Sensing unit 18 is contained in cylindrical cup 22 of molded plastic that fits snugly in a cavity in stub 19. A sealing O-ring 22a on cup 22 prevents leakage past the cup. An inductive impedance 20, which may be a coil on a rigid magnetic core, has one terminal 20a (FIG. 2) joined to sensing electrode 24. This sensing electrode is a metal disc or, alternatively, a coating on the inside bottom surface of the cup or on inductive impedance 20. The cup is spaced reasonably from vanes 14b in the flow passage. Cup 22 is a molded plastic cover over the sensing electrode, protecting it from corrosion or other possible attack by the fluid.

An ideal form of impedance 20 is a coil on a magnetic ceramic core, having terminals 20a and 20b. Coil 20 is spaced from the side walls of cup 22 by cover 22b of the cup, as one way to limit the amount of stray capacitance between the coil (mainly that part of the coil nearest electrode 24) and metal components outside cup 22. Terminal 20a forms—or is—a junction or common connection between the coil and electrode 24. In other forms of unit 18, terminal 20a may have some short length, forming a small separation between the coil and the electrode. Inductive impedance 20 may alternatively be a resonant quartz crystal or a resonant ceramic crystal 20' (FIG. 2A). Such crystals have flat metal-film terminals, and then one terminal of a crystal may be arranged to serve as sensing electrode 24'.

Sensing electrode 24 is one terminal of a variable sensing capacitive impedance involving the sensing electrode 24 and a companion electrode which may be a nearby grounded metal structure, and the dielectric in the space between them, mainly the flowing fluid. As will be seen from the following discussion, there may be no grounded metal nearby, and then the companion electrode can be ground of the circuit equipment connected to sensing unit 18.

In operation, excitation impressed on sensing electrode 24 (e.g. 19 MHz) causes a distributed field to develop that spreads from the sensing electrode where it is most concentrated to any and all conductive material nearby (and distant material, too) which is connected to "ground" of the circuit connected to unit 18.

The distributed field has greatest concentration nearest the sensing electrode, part of the path of the outermost portions of blades or vanes 14b. When the vanes are far from electrode 24, the concentrated field of electrode 24 extends into the space between the blades that is filled by the flowing fluid.

Capacitive sensing electrode 24 and its companion capacitive electrode (ground) and the space between the electrodes and the moving vanes in that space form a flow-varied capacitor or capacitive impedance.

That capacitance and the resulting capacitive impedance at the excitation frequency vary as the rotor blades pass into and out of proximity to electrode 24, on the assumption that the dielectric constant of the rotor's blades differs from the dielectric constant of the rotor-actuating fluid. (If the dielectric constant of the blades is the same as that of the flowing fluid, the blades can by design have a different loss factor than that of the flowing fluid.)

As described above, unit 18 includes an inductive impedance 20 in the form of a coil or, as alternatives, in the form of a quartz crystal wafer or it may be a ceramic poly-crystalline wafer. FIG. 3 is the equivalent circuit of a resonant crystal. It includes inductance L and capacitance C between opposite-terminals T of the series circuit. The inductance L and the capacitance C that determine the series-resonant frequency of the crystal; and it includes resistance R, being the effective resistance of the crystal that represents electrical loss. Terminals T are Commonly conductive films or plates. Capacitance C' the terminals is in series with the effective capacitance c, forming a capacitance which, with inductance L, form a parallel-resonant circuit. The frequencies of series resonance and parallel resonance are usually quite close to each other.

In FIG. 4, the solid-line curve A represents the reactance of a resonant crystal as it varies with the frequency of an applied excitation signal. The reactance is zero at the parallel-resonance frequency fp and at series-resonance frequency fs. Above the zero line, the reactance is inductive, and below the line the reactance is capacitive. A resonant crystal represents an inductive impedance in that region B of curve A, when excited at a frequency between fp and fs. The dotted-line curve D represents the variation of the effective resistance of the crystal for a range of frequencies. The effective resistance at its maximum is very small, because of low losses of a resonant crystal, especially quartz.

FIG. 5 shows a probe-type flow detector that incorporates unit 18 and other identical components 22 and 24 of FIGS. 1 and 2. This flow detector includes a support structure or frame consisting of hollow shaft or stem 30, top and bottom frame elements 32 and 34, and side posts 36, being made at least largely of corrosion-resistant metal. The illustrative probe shown here includes a vaned rotor 14 having a hub 14a and vanes 14b that extend radially outward and that have a spiral twist along the hub. Shaft 16 supports the rotor, in turn carried by suitable bearings fixed to side posts 36. While only one vaned rotor is used in this illustrative probe, it is contemplated that two vaned rotors will be used in the manner and for the purposes explained in my '696 patent mentioned above, and incorporated here by reference. Shaft or stem 30 extends through a conventional coupling structure 30A that seals the stem to the pipe. Shaft 16 of rotor 14 extends parallel to the flow path. Because the assembly 14, 32, 34, 36 must be small enough to be inserted via a reasonably small hole in the pipe, rotor 14 and its sensing electrode 24 are quite small in practical probes.

Unit 18 (FIG. 2) is contained in cast insulation 32a in a metal cup 32b. In operation, excitation impressed on terminal 20b causes a distributed field to develop which extends from sensing electrode 24 into the path of vanes 14b and to the various metal surfaces of frame structure 30, 32, 34, 36 as well as to any metal pipe 10A (FIG. 5A) in which the probe is mounted. Such structure ordinarily has a wired connection to ground of the circuit equipment that excites the sensing structure and derives flow-representing signals. The pipe may be a section of plastic pipe, without impairing operation of the apparatus. Basically, sensing electrode 24 and ground are the opposite terminals of a variable capacitive sensing impedance.

In the flow detectors of FIGS. 1 and 5, the series impedances characteristically develop very high excitation voltage at their common connection or junction. The capacitive sensing impedance may have a capacitance of only 1.0 pico farad that is varied by operation of rotor 14. This capacitance includes not only that portion of the electrode's capacitance that is varied by the flow-actuated rotor, but stray capacitance too, i.e., that portion of the total capacitance that is not affected by the blades of rotor 14. A large amount of stray capacitance would reduce the percentage change of the capacitance affected by the rotor blades. Accordingly, any circuit connection to the sensing electrode other than the common connection between the inductive and capacitive impedances should be avoided for greatest efficiency in extracting flow-representing signals. For the same reason, any lead that is used (in a modified structure) to connect electrode 24 to inductive impedance 20 should by design have a minimum amount of stray capacitance to ground.

FIG. 8 is a diagrammatic representation of the variable sensing capacitance 38 (identified with Sensing electrode 24) and inductive impedance 20, their common connection 20a, and wiring 20b' with its stray capacitance 20b". Components 20, 38 and wiring 20b' with its distributed capacitance 20b' represent an impedance transforming filter in which, at and near resonance, terminal 20a is at the high-impedance terminal of inductive impedance 20, and wiring 20b' is connected to its low-impedance terminal. By locating the high-impedance terminal of inductive, impedance 20 in close proximity to electrode 24 and by virtue of the impedance transformation effect of the inductive impedance 20 in that configuration, the sensing capacitance is largely isolated from the stray capacitance of the circuit wiring.

A fundamental form of circuit, useful with the flow-detecting structures of FIGS. 1 and 5, is shown in FIG. 6. As seen there, a flow-responsive capacitive impedance 38 between sensing electrode 24 and its companion electrode E (ground), made variable by vanes 14b, and inductive impedance 20 are connected to each other as series impedances between lead 20b' and ground. An excitation source 40 is coupled to lead 20b' via capacitor 42. Lead 20b' is connected to a detector comprising a voltage-doubling diode circuit that includes diodes 44 and 46, and a carrier-bypass filter including resistor 48 and capacitor 50. Flow-representing output is coupled by capacitor 52 to terminal 54.

In FIG. 6, sensing capacitive electrode 24 is connected only to coil 20, so that rotor blades 14b have greatest effect in modifying the capacitive impedance. The series impedances 20 and 38 are at or near series resonance at the frequency of excitation source 40 when the vanes are in one position relative to electrode 24. As the rotor turns, the impedance of the series-circuit 20, 38 follows a steep frequency-versus-impedance curve, yielding a flow-representing modulated carrier at wiring 20b'. The impedance transformation characteristic of the network causes the stray capacitance of wiring 20b' to add but little to the capacitance of electrode 24.

FIG. 7 represents an eminently practical apparatus for providing a flow-representing output signal using the flow-sensing structures of FIGS. 1 and 5. The signal results from vanes 14b of the rotor passing capacitive sensing electrode 24. In its usual form, rotor 14 and its blades are of a low-loss plastic having a dielectric constant that contrasts with that of the fluid to be monitored. For example, the dielectric constant of the rotor's plastic may be 2. or 3. That rotor is suitable for sensing the flow of various liquids, and of air which has a dielectric constant of 1.0. In the special circumstance of monitoring the flow of a liquid having approximately the same dielectric constant as that of the vaned rotor, a lossy material for the rotor may be selected, even a conductive rotor may be used, without changing the basic mode of operation.

In FIG. 7, a sensing capacitance 38 is,formed between the electrode 24 and companion electrode E (ground), and the material in the space between the electrodes. The impedance of the sensing capacitance 38 and inductive impedance 20 form series-connected capacitive and conductive impedances. Excitation is impressed by wiring 20b', a low-impedance portion of the circuit, compared to the high impedance level at electrode 24. The excitation frequency is chosen so that resonance or near-resonance occurs when a rotor vane is opposite to electrode 24 or when two vanes are equally distant and so that shift of the rotor causes a steep rise of the end-to-end impedance of the series-connected capacitive and inductive impedances.

In FIG. 7, amplifying device 56 is a bipolar transistor. The transistor is part of an amplifier that has a gain-control circuit between its emitter and ground. The gain control circuit comprises resistor 58 and the series-resonant circuit 20, 38 (FIG. 8). One terminal of the gain control circuit is the junction F of the series resonant circuit, resistor 58 and the transistor's emitter. The opposite terminal of the series-resonant circuit and the opposite terminal of resistor 58 is ground Gnd. Resistor 58 provides a high-resistance d-c path to ground for the emitter. The resistance of resistor 58 is large, to limit the gain of the transistor to a low value. Wiring 20b' connects the series-connected inductive and sensing impedances 20 and 38 as a shunt from the emitter to ground, bypassing resistor 58. As rotor 14 turns, the impedance of the series-connected impedances varies widely, from near-zero at resonance, forming a variable gain control impedance for transistor 56 between terminal F and ground Gnd.

Transistor 56 serves both as an oscillator for providing excitation at constant frequency and as an amplifier for flow-representing signals derived from the series-connected impedances 20 and 38. A frequency-determining "tank" circuit 60 is connected to the collector of transistor 56, here being a coil including its distributed capacitance. A regenerative feedback coil 62 is connected between the transistor's base and a biasing network 72 (considered below).

The oscillator's amplitude varies, depending on the gain of the amplifier which, in turn, depends on whether capacitive sensing impedance, 38 shifts series-connected impedances 20 and 38 closer to resonance or farther from resonance, as rotor 14 turns. This impedance variation is enhanced and the variation of the oscillator's signal is increased by minimizing the stray capacitance associated with sensing electrode 24. The sensing electrode 24 in an example may be a 0.20-inch diameter disc for responding to a rotor vane 0.035-inch thick of polysulfone. The stray capacitance of wiring 20b'—including a connection extending along a 15-inch stem of a probe—may be of the order of 30 pf. However, this stray capacitance is on the low impedance side of what is in effect an impedance matching network. Only a very small fraction of that 30 pf is reverse-coupled and thus added to the sensing electrode's capacitance.

The oscillator signal is coupled by capacitor 64 to voltage-doubling demodulator 66, and the flow-representing signal reaches output terminal 70 via d.c. blocking capacitor 68. The output of the demodulator is also impressed on a long-time-constant filter 72 that provides stabilizing bias on the transistor's base.

The series-connected inductive impedance and a small sensing capacitive electrode, constructed and operated as described above, provide novel and unique flow-sensors, notably of the probe type. The very small sensing electrode that senses a vaned rotor of molded insulation is largely unaffected by the stray capacitance of circuit wiring in a long stem of the probe. But the described apparatus is also advantageous in other flow-sensing apparatus, where there may be no probe and where the flow-actuated device is not a vaned rotor.

FIG. 9 illustrates diagrammatically an alternative form of flow sensor, broadly similar to that of FIGS. 1-8 in some respects. In FIG. 9, sensing electrode 24, its companion electrode E and vaned rotor 14 are all as described above, particularly as in FIG. 5 where there is a long supporting stem 30. Also (as in FIG. 5) a device 20' is assembled to the sensing electrode as part of the probe for providing a large measure of isolation between the sensing electrode 24 and a potentially large amount of stray capacitance of connecting wiring 20b' to the circuit that derives the output signal.

In FIG. 9, excitation is coupled from a source 80 of carrier frequency via capacitor 82 to electrode 24. A transistor 84 has a high-impedance input terminal, e.g. the gate of an FET, connected to sensing electrode 24 and to a bias-providing resistor 86. Components 82, 84 and 86 form an assembly 20' in close proximity to sensing electrode 24 in cup 22, in place of inductive impedance 20 in FIG. 2. Connections 88 are of minimal length and thickness so as to avoid adding more than minimal stray capacitance to electrode 24. Wires 90, 92, 94 and 96 extend via stem 30 to the exterior of the probe. Capacitor 82 can and should be very small, e.g. 1.0 pf, and resistor 86 may be physically tiny but large in resistance, so as to add only minimal stray capacitance. The gate of transistor 84 and wires 90, 92, 94 and 96 add a small amount of capacitance to electrode 24.

The sensing capacitive impedance comprising electrodes 24 and E and the dielectric in the space between them is rendered variable as the vanes of rotor 14 sweep past electrode 24, as in FIGS. 1-8. Transistor 84, having its high-impedance gate G connected to sensing electrode 24 and its low-impedance source S arranged as a signal output connection, constitutes an impedance transformation device in series with the capacitive sensing impedance. The series-connected impedances are connected via output terminal 98 to a circuit, (not shown) that amplifies and utilizes the flow-representing signal that develops in response to actuation of rotor 14.

Transistor 84 represents an impedance transformation device incorporated in the probe in close proximity to the sensing electrode. The sensing electrode 24 and the high input impedance terminal of device 84 are at the high impedance level; and the wiring extending from the FET to an external signal circuit is at the low-impedance level. There are some stray capacitances in FIG. 9 that are not found in FIGS. 1-8 as additions to the capacitance identified with FIGS. 1-8. Moreover, a probe as in FIG. 9 would subject the transistor to perhaps disabling temperature if high-temperature flow is to be monitored. While the apparatus of FIG. 9 is inferior to that of FIGS. 1-8 in these respects, nevertheless FIG. 9 has its own distinctive merit.

The vaned rotor of FIGS. 1-9 is of low-loss insulation, and has a dielectric constant that is distinctly greater than unity, which is the dielectric constant of air. Many liquids also have a dielectric constant that is nearly unity. Where the dielectric constant of a particular liquid to be monitored is close to that of molding materials suitable for the rotor, the rotor can be made lossy as by incorporating carbon particles. But, while the described apparatus involves flow sensing under very difficult conditions, e.g., the detection of changes at the sensing electrode caused by thin vanes of insulation, other forms of flow-actuated device can be substituted as circumstances allow, for example vaned metal rotors, orbital balls, and so forth.

It is evident that the illustrative embodiments of the invention described above in detail and shown in the drawings may be modified and applied in various ways by those skilled in the art. Therefore, the invention should be construed broadly, in accordance with its true spirit and scope.

I claim:

1. Flow sensing apparatus including a series circuit having opposite end terminals and having a sensing capacitor and an inductor in series with each other interposed between said opposite end terminals, said sensing capacitor having a capacitive sensing electrode and a companion electrode which, when energized in operation, have a distributed field between them in a passage for fluid whose flow is to be monitored and said sensing capacitor having a flow-actuated device operated by the fluid through a range of positions in relation to the sensing electrode and to said field for developing flow-representing changes in said sensing capacitor, said inductor having first and second inductor terminals, said capacitive sensing electrode being in close proximity to and having a direct connection to said first inductor terminal, said direct connection being connected to the remainder or the apparatus only via said sensing capacitor and said inductor, said companion electrode and said second inductor terminal being connected to said opposite end terminals, respectively, and circuit means connected to and interposed between said opposite end terminals of the series circuit, for deriving flow-representing signals in response to said flow-activated device, said apparatus having excitation means for providing said series circuit with constant-frequency excitation at or close to the series-resonant frequency of the series circuit.

2. Flow sensing apparatus as in claim 1 wherein said excitation means includes an oscillator for generating said constant-frequency excitation and wherein said oscillator includes an amplifier connected to the first and second end connections of the series circuit.

3. Flow sensing apparatus as in claim 1 including an amplifier having a variable gain-control circuit that includes said series circuit, and means acting through said amplifier to impress constant-frequency excitation on said series circuit, the excitation frequency being at or close to a frequency at which the series-circuit is series-resonant when the flow-actuated device has any particular relationship to said sensing electrode.

4. Flow sensing apparatus as in claim 1 wherein said excitation means includes a source of constant-frequency excitation and means for impressing the excitation on said series circuit, the excitation frequency being at or close to a frequency at which the series circuit is series-resonant.

5. Flow sensing apparatus as in claim 4 wherein the flow-actuated device has a dielectric constant that contrasts significantly with the dielectric constant of the fluid whose flow is to be sensed, whereby the flow-actuated device causes the reactance of the capacitive impedance at the excitation frequency to vary when the flow-actuated device is flow-driven.

6. Flow sensing apparatus as in claim 4 wherein the flow-activated device is prominently lossy, whereby the flow-actuated device causes variations of effective resistance in the capacitive impedance when the sensing electrode is excited and the flow-actuated device is driven by fluid whose dielectric constant approximates the dielectric constant of said flow-actuated device.

7. Flow sensing apparatus as in claim 1 wherein said companion electrode constitutes one of said end connections of the series circuit.

8. Flow sensing apparatus as in claim 7 wherein said flow-actuated device is a rotor having flow-actuated vanes movable successively into proximity to the sensing electrode.

9. Flow sensing apparatus as in claim 1 wherein said circuit means includes an amplifier having an impedance-responsive gain-control circuit, said series circuit being connected in said gain-control circuit and being an impedance rendered variable by operation of said flow-actuated device.

10. Flow sensing apparatus as in claim 9 wherein said gain-control circuit is arranged to impress said excitation on said series circuit.

11. Flow sensing apparatus as in claim 1 wherein said sensing capacitor and said inductor constitute an assembly and wherein said apparatus includes an elongated support.

12. Flow responsive apparatus as in claim 11, further including an elongated support having an assembly at an end thereof, said assembly comprising said inductor, said junction and said sensing capacitor, and said elongated support being adapted to extend through the wall of a pipe and to support said assembly within the pipe.

13. Flow sensing apparatus for monitoring the flow of fluid, said apparatus comprising a circuit which constitutes an amplifier, said amplifier having at least one amplifying device, and said amplifier having a pair of terminals and gain control impedance connected between said terminals for providing substantial control of the gain of the amplifier, said gain control impedance including variable impedance that changes in value in dependence on the frequency of the excitation signal applied to it and whose impedance varies in dependence on the flow of fluid to be monitored, said apparatus having means for providing a constant-frequency excitation signal and for applying said excitation signal to said variable impedance, and said apparatus having means for deriving from said variable impedance a signal representing the flow to be monitored.

14. Flow sensing apparatus as in claim 13, wherein said excitation signal applying means includes an oscillator that comprises said amplifier.

15. Flow sensing apparatus as in claim 13 wherein said gain control impedance comprises a capacitive impedance and an inductive impedance connected to each other as a series circuit, one of said impedances comprising said flow-responsive variable impedance means.

16. Flow sensing apparatus as in claim 13 wherein said flow-responsive variable impedance means comprises a sensing electrode which, in operation, has a distributed field that extends to a first one of said pair of gain-control terminals and said flow-responsive variable impedance means further including a fluid-actuated rotor having vanes of plastic which, in operation, sweep successively close to the sensing electrode, said gain control impedance means including an inductor having a first end connection of minimal length directly connected only to said sensing electrode and said inductor having a second end connection connected to the second one of said pair of gain-control terminals.

17. Flow sensing apparatus as in claim 16 wherein said inductive impedance comprises a resonant crystal device whose resonant frequency is so related to the excitation frequency that said resonant crystal device simulates an inductive impedance.

18. Flow sensing apparatus as in claim 15, wherein said series circuit is a series-resonant circuit having a connection of minimal length joining said impedances to each other and said series circuit having separate connections at its opposite ends constituting said pair of terminals.

19. Flow sensing apparatus including a probe for insertion within an opening of a wall of a conduit having an elongated support bearing at an end thereof an assembly comprising (a) a capacitive electrode, (b) a flow activated vaned rotor supported close to said electrode so that, in operation, vanes of the rotor move in succession past said electrode, (c) an inductive impedance disposed in close proximity to said electrode, said inductive impedance having first and second terminals, and (d) a junction that forms a direct connection from said capacitive electrode only to said first terminal of said inductive impedance.

20. Flow sensing apparatus as in claim 19 further including circuit means remote from said assembly for deriving a flow-representing signal representing the operation of said vaned rotor, said circuit means including an amplifier having an impedance-responsive variable gain-control circuit that comprises said inductive impedance and said capacitive sensing electrode, and an oscillator comprising said amplifier for developing an excitation signal which is applied to the gain-control circuit by the amplifier.

21. Apparatus for sensing the flow of fluid in a passage, including a sensing capacitor comprising a sensing electrode and a companion electrode, said electrodes when in operation developing a distributed field between them in said passage, a flow-actuated rotor having vanes operable successively past said sensing electrode for interacting variably with said field and thereby developing flow-representing variations of impedance of said sensing capacitor, circuit means for both applying excitation to and deriving flow-representing output signals from said sensing capacitor, and an impedance transformation device interposed between said circuit means and said sensing electrode for transforming the impedance from a relatively high level prevailing at said sensing electrode to a relatively low level prevailing at said circuit means, said impedance transformation device having a high impedance terminal disposed in close proximity to said sensing electrode and connected thereto, and said impedance transformation device having a low-impedance signal output terminal, said circuit means having respective connections to said companion electrode of the sensing capacitor and to said low-impedance signal output terminal of the impedance transformation device, said connections of said circuit means to said low-impedance signal output terminal and to said companion electrode having distributed capacitance that is largely isolated by said impedance transformation device from said capacitive sensing electrode.

22. Apparatus for sensing the flow of fluid as in claim 21, wherein said impedance transformation device is an inductor which, with said capacitive sensing impedance, is at or close to series resonance at the frequency of said excitation when vanes of the rotor have any particular relationship to said sensing electrode.

23. Apparatus for sensing the flow of fluid as in claim 21, wherein said impedance transformation device is a semi-conductor-follower device.

24. Apparatus for sensing the flow of fluid as in claim 21, including an elongated support and an assembly carried at one end thereof, said assembly including said sensing electrode and said rotor and said impedance transformation device, said support and said assembly forming a probe proportioned for insertion into a pipe via a hole in the wall of the pipe.

25. Flow-sensing apparatus including:
a flow-responsive capacitor comprising a capacitive sensing electrode and a companion electrode which, when energized in operation, have a distributed field between them, and a device operable by flowing fluid into varying physical relationships to said sensing electrode and to said field for causing variations in the impedance of said flow-responsive capacitor,
an inductor having multiple terminals including first and second terminals, said first terminal being in close proximity to said sensing electrode,
means of minimal length for connecting said sensing electrode only to said first terminal of the inductor, said flow-responsive capacitor and said connecting means and said inductor forming a series circuit, said companion electrode of the sensing capacitor and said second terminal of the inductor being opposite end terminals of the series circuit, and
circuit means connected between said companion electrode and said second terminal of the inductor for applying constant-frequency excitation to and deriving flow-representing signals from said series circuit.

26. Flow-sensing apparatus as in claim 25, wherein said flow-activated device is a vaned turbine whose vanes have edges that sweep past the sensing electrode in response to fluid flow.

27. Flow-sensing apparatus as in claim 25, wherein said flow-activated device, in operation of the apparatus, is immersed in the fluid whose flow is to be monitored, and wherein said sensing electrode is covered by protective insulation.

28. Apparatus for sensing the flow of fluid in a passage, including a capacitive sensing impedance comprising a sensing electrode and a companion electrode, said electrodes when energizes in operation, developing a distributed field between them in said passage, a flow-actuated rotor having vanes operable successively past said sensing electrode for interacting variably with said field and thereby developing flow-representing variations of said capacitive sensing impedance, an inductive impedance having first and second terminals, said first terminal being in close proximity to said sensing electrode and connected thereto, said capacitive impedance and said inductive impedance forming a series-resonant circuit, said companion electrode and said second terminal of said inductive impedance, constituting opposite terminals of said series-resonant circuit, and circuit means interposed between and connected to the opposite terminals of said series-resonant circuit for both applying excitation to and deriving flow-representing signals from said series-resonant circuit.

29. Apparatus for sensing the flow of fluid in a passage, said apparatus including
a probe including an elongated support and a sensing assembly at an end of said elongated support, said assembly including a capacitive sensing electrode and an inductive impedance, the latter having first and second terminals, said first terminal of said inductive impedance and said capacitive sensing electrode being connected to each other at a junction, said apparatus having means acting as a companion capacitive electrode, and said sensing assembly having a flow-activated rotor including vanes which, as the rotor turns, sweep along a path close to said capacitive sensing electrode so that said sensing capacitive electrode and said companion capacitive electrode are terminals of a capacitive impedance which is rendered variable by said rotor, said capacitive impedance and said inductive impedance thus being connected in series in a series-resonant circuit, said junction being at a first impedance level of the series-resonant circuit and both said companion electrode and said second terminal of the inductive impedance being at a second impedance level of the series-resonant circuit, said first impedance level and said second impedance level being relatively high and low, respectively, in relation to each other,
circuit means for both providing excitation to and deriving flow-representing variations from said series-resonant circuit,
and a line extending at least along said elongated support for interconnecting said circuit means and the second terminal of said inductive impedance, said apparatus including connection means from said companion electrode to said circuit means, said line having distributed capacitance to said connection means at said second impedance level.

30. Flow responsive apparatus including a flow sensing capacitor that includes a sensing electrode and a companion electrode, said sensing capacitor including flow-activated means for varying the impedance between said electrodes, an inductor having first and second terminals, said first terminal of the inductor and the sensing electrode being in close proximity to each other, a junction constituting a direct connection between said first terminal of the inductor and said sensing electrode so that said inductor and said sensing capacitor are connected to each other as a series circuit, said companion electrode and said second terminal of the inductor constituting the opposite end terminals of the series circuit, and a signal utilization circuit having respective connections to said opposite end terminals of said series circuit for applying excitation thereto and for deriving flow representing signals therefrom, said junction of the series circuit being connected to said signal utilization circuit only via said indicator and said sensing capacitor.

31. A probe for flow sensing apparatus, said probe including an elongated metal tubular support having a longitudinal bore, and said elongated support bearing at a first end thereof an assembly comprising (a) a capacitive electrode, (b) a flow activated vaned rotor supported close to said electrode so that, in operation, vanes of the rotor move in succession past said electrode, (c) an inductive impedance having a terminal disposed in close proximity to said capacitive electrode, and (d) a junction that forms a direct connection from said capacitive electrode only to said terminal of said inductive impedance, said probe including a conductor extending from a second terminal of said inductive impedance via said longitudinal bore to and beyond a second end of said elongated tubular support remote from said first end thereof.

* * * * *

UNITED STATES PATENT AND TRADEMARK OFFICE
CERTIFICATE OF CORRECTION

PATENT NO. : 5,392,657

DATED : Feb. 28, 1995

INVENTOR(S) : Murray F. Feller

It is certified that error appears in the above-indentified patent and that said Letters Patent is hereby corrected as shown below:

Col. 3, line 63, "variables" should read --variable--.

Col. 5, line 64, "opposite-" should read --opposite-end--.

Col. 5, line 65, "that" should be deleted.

Col. 6, line 1, "Commonly" should read --commonly--.

Col. 6, line 3, "c" should be --C--.

Col. 10: In claim 6, line 65, "prominently" should read --distinctly more--.

Col. 10: In claim 6, line 65, after "lossy" there should be inserted --than the liquid with which the apparatus is to be used--.

UNITED STATES PATENT AND TRADEMARK OFFICE
CERTIFICATE OF CORRECTION

PATENT NO.  : 5,392,657
DATED       : February 28, 1995
INVENTOR(S) : Murray F. Feller It is certified that error appears in the above-indentified patent and that said Letters Patent is hereby corrected as shown below:

Col. 11: In claim 9, line 13, "connected in" should read --at least part of--.

Col. 11: In claim 12, line 23, "11" should read --30--.

Col. 11: In claim 11, after "support" line 22, , there should be inserted --said assembly being fixed to an end of said elongated support--.

Col. 13, at line 46 (in claim 28), "energizes" should read --energized--.

Signed and Sealed this

Twenty-third Day of July, 1996

Attest:

BRUCE LEHMAN

Attesting Officer     Commissioner of Patents and Trademarks